United States Patent
Hong et al.

(10) Patent No.: US 10,452,204 B2
(45) Date of Patent: Oct. 22, 2019

(54) OPTICAL TOUCH CONTROL SYSTEM AND OPTICAL SENSOR THEREOF

(71) Applicant: EVEREST DISPLAY INC., Hsinchu (TW)

(72) Inventors: Hei-Tai Hong, Hsinchu County (TW); Yueh-Hong Shih, Hsinchu (TW); Chun-Yuan Cheng, Hsinchu (TW)

(73) Assignee: EVEREST DISPLAY INC., Hsinchu (TW)

( * ) Notice: Subject to any disclaimer, the term of this patent is extended or adjusted under 35 U.S.C. 154(b) by 189 days.

(21) Appl. No.: 15/688,985

(22) Filed: Aug. 29, 2017

(65) Prior Publication Data

US 2018/0067575 A1 Mar. 8, 2018

(30) Foreign Application Priority Data

Sep. 2, 2016 (TW) ............................. 105128450 A

(51) Int. Cl.
  *G06F 3/042* (2006.01)
  *G02F 1/1333* (2006.01)

(52) U.S. Cl.
  CPC .......... *G06F 3/042* (2013.01); *G02F 1/13338* (2013.01)

(58) Field of Classification Search
  CPC ..... G06F 3/042; G06F 3/0425; G02F 1/13338
  See application file for complete search history.

(56) References Cited

U.S. PATENT DOCUMENTS

| | | | |
|---|---|---|---|
| 2011/0242054 A1* | 10/2011 | Tsu | G06F 3/0425 345/175 |
| 2014/0313165 A1* | 10/2014 | Lam | H04N 9/3179 345/175 |
| 2015/0242057 A1* | 8/2015 | Galela | G06F 3/0428 345/175 |
| 2015/0355781 A1* | 12/2015 | Lin | G06F 3/0425 345/175 |
| 2017/0205961 A1* | 7/2017 | Chen | G06F 3/0383 |
| 2017/0371609 A1* | 12/2017 | Lee | G06F 3/14 |

* cited by examiner

*Primary Examiner* — Towfiq Elahi
(74) *Attorney, Agent, or Firm* — Li & Cai Intellectual Property (USA) Office

(57) ABSTRACT

An optical touch control system and an optical sensor thereof are provided. The optical sensor can be applied to a display having a display surface. The optical sensor includes a connecting frame, a light curtain module and a light emitter. The connecting frame has a first end portion and a second end portion opposite the first end portion. The light curtain module is disposed between the first end portion and the second end portion of the connecting frame. The light curtain module includes a light emitter electrically connected to the display so as to generate an invisible light curtain parallel to the display surface. The optical detection module is disposed on the second end portion of the connecting frame. The optical detection module includes a light detector electrically connected to the display so as to retrieve information about a touch location where an object touches the invisible light curtain.

10 Claims, 5 Drawing Sheets

OPTICAL TOUCH CONTROL SYSTEM AND OPTICAL SENSOR THEREOF

BACKGROUND OF THE INVENTION

1. Field of the Invention

The present disclosure relates to a touch control system and the sensor thereof; more particularly, to an optical touch control system and an optical sensor thereof.

2. Description of Related Art

An optical touch control device in the prior art is often applied to a display and includes a light curtain emitter and a light sensor. When in operation, the light curtain emitter generates an invisible light curtain in front of the display while the light sensor senses light. More specifically, when an object touches the display, the object blocks the light path of the invisible light curtain, and the light sensor determines the touch position by determining the position where the light curtain stops sending light signals to the light sensor.

Since the light sensor and the light curtain emitter are separated from each other, there often exists a time gap between the time point where the object touches the display and the time point where the light sensor detects the touch position. Furthermore, the fact that the light sensor and the light curtain emitter are disposed separately leads to the need to adjust the relative position therebetween before use, and also leads to higher costs since the light sensor and the light curtain emitter have to be installed on the display separately. In addition, the light sensor and the light curtain emitter being manufactured separately causes inconvenience in installation.

Therefore, providing a solution so as to improve the above-mentioned problems has become an important issue in the art.

SUMMARY OF THE INVENTION

Accordingly, one objective of the present disclosure is to provide an optical touch control system and an optical sensor thereof which overcome the aforementioned problems.

One embodiment of the present disclosure provides an optical sensor applicable to a display having a display surface. The optical sensor includes a connecting frame, a light curtain module and a light emitter. The connecting frame has a first end portion and a second end portion disposed opposite the first end portion. The light curtain module is disposed between the first end portion and the second end portion of the connecting frame, in which the light curtain module includes a light emitter electrically connected to the display so as to generate an invisible light curtain parallel to the display surface. The optical detection module is disposed on the second end portion of the connecting frame, in which the optical detection module includes a light detector electrically connected to the display so as to retrieve information about a touch location where an object touches the invisible light curtain.

Another embodiment of the present disclosure provides an optical touch control system including a display with a display surface and an optical sensor. The optical sensor includes a connecting frame, a light curtain module and an optical detection module. The connecting frame has a first end portion and a second end portion disposed opposite the first end portion. The light curtain module is disposed between the first end portion and the second end portion of the connecting frame, in which the light curtain module includes a light emitter electrically connected to the display so as to generate an invisible light curtain parallel to the display surface. The optical detection module is disposed on the second end portion of the connecting frame. The optical detection module includes a light detector electrically connected to the display so as to retrieve information associated with a touch location where an object touches the invisible light curtain. The optical sensor includes a control module electrically connected to the light detector and the display such that the information retrieved by the optical detection module can be transmitted through the control module to the display.

The present disclosure is advantageous in that, through the modularization of the light detection module and the light curtain module, which are combined together in the optical touch control system and the optical sensor thereof, the time gap between the detection of the touch position and the touch action can be reduced and the synchronicity therebetween can be enhanced. Furthermore, the modularization of the optical detection module and the light curtain module reduces the manufacturing costs and allows the relative position between the optical detection module and the light curtain module to be determined and calibrated during the manufacturing process, and thus spare the time needed for adjustment before and during use. In addition, the optical touch control system and the optical sensor thereof are advantageous for its easy installation due to the modularization.

For further understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

The First Embodiment

Figure 1:
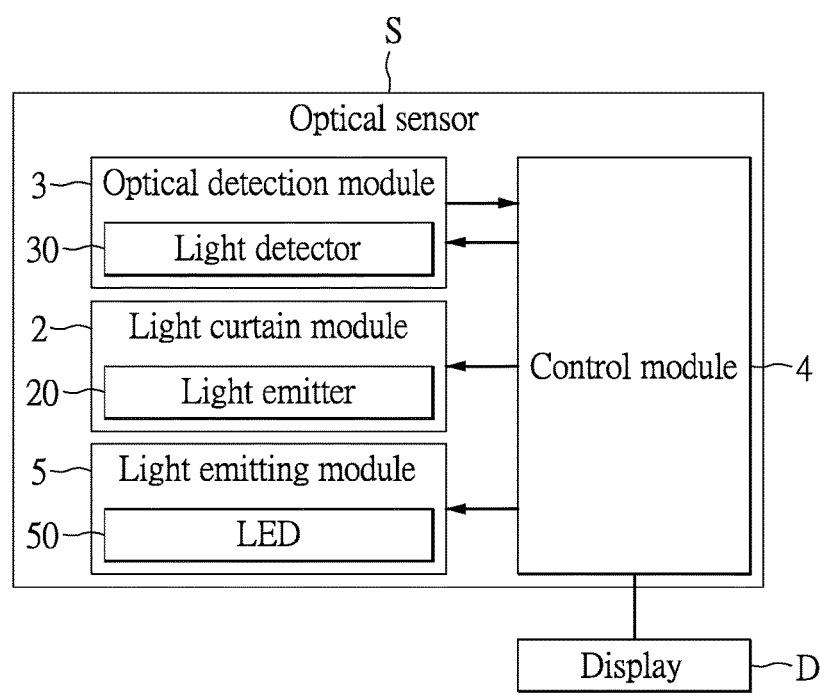
FIG. 1 is a block diagram illustrating the optical touch control system and the optical sensor thereof according to the present disclosure.
Figure 2:
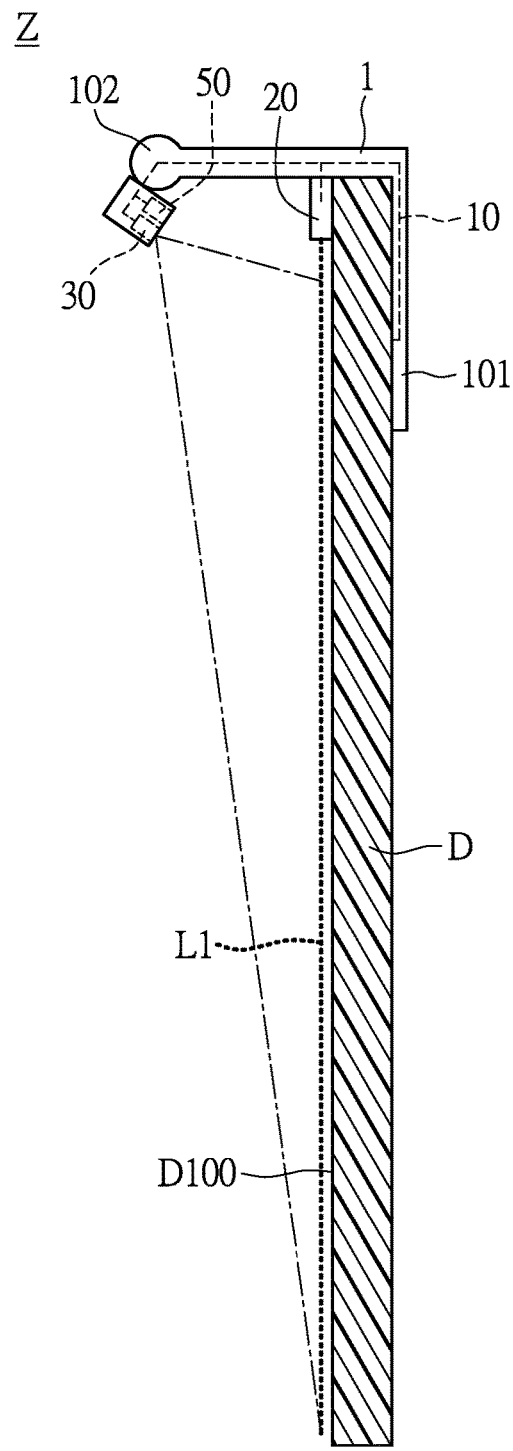
FIG. 2 is a schematic diagram illustrating the optical touch control system according to a first embodiment of the present disclosure.
Figure 3:
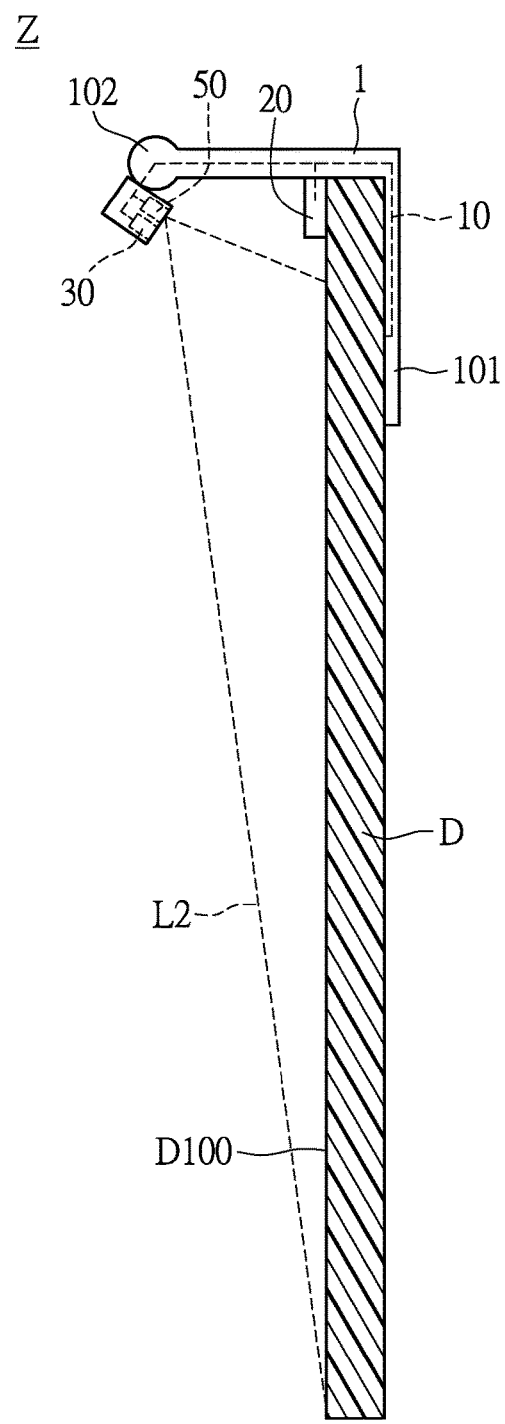
FIG. 3 is a schematic diagram illustrating the light emitting module of the optical touch control system projecting decoration light onto the display according to the first embodiment of the present disclosure.
Figure 4:
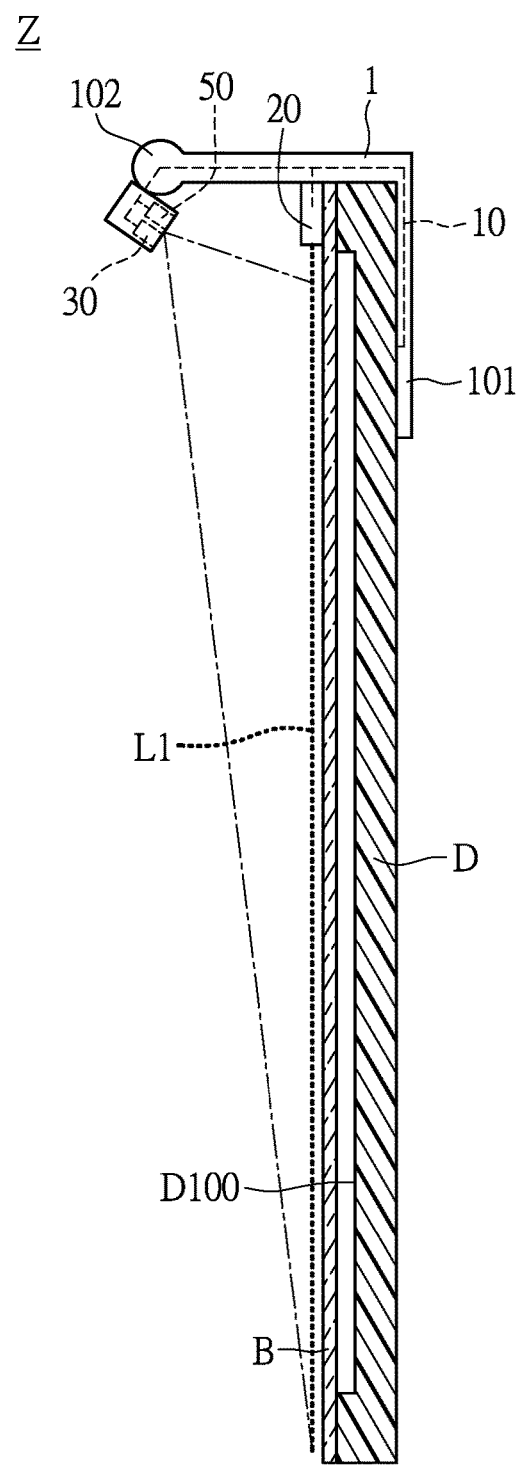
FIG. 4 is a schematic diagram illustrating an optical touch control system according to a second embodiment of the present disclosure.
Figure 5:
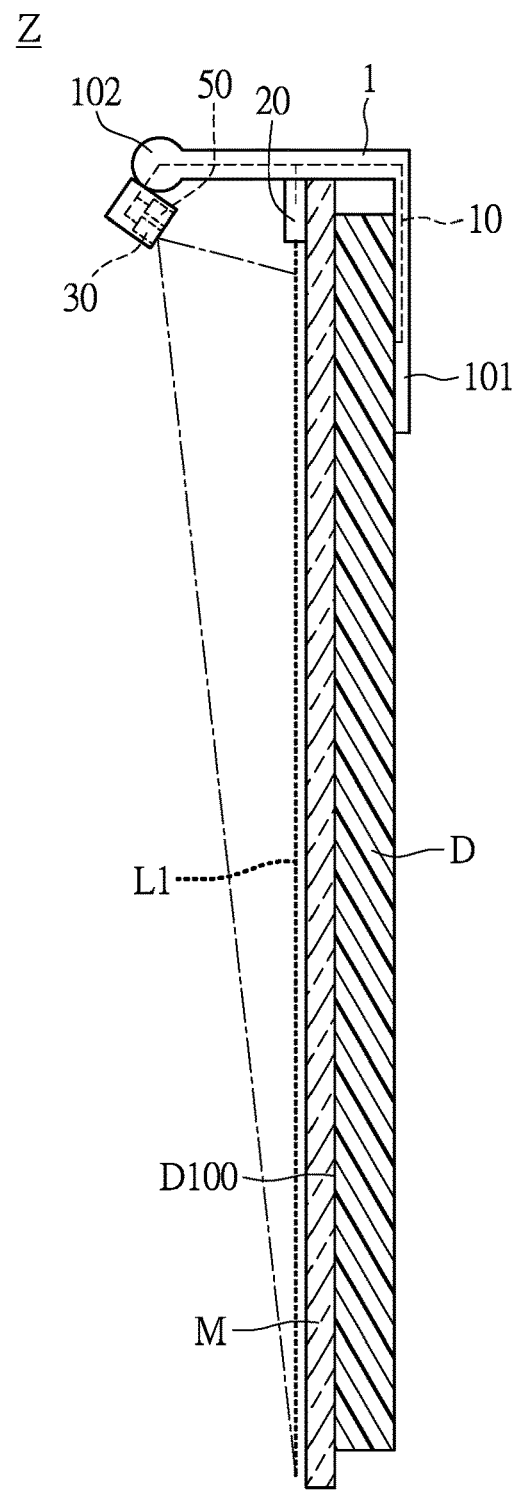
FIG. 5 is a schematic diagram illustrating an optical touch control system according to a third embodiment of the present disclosure.

Referring to FIGS. 1 to 3, the first embodiment of the present disclosure provides an optical touch control system Z, which includes a display D and an optical sensor S. The display D has a display surface D100. The optical sensor S includes a connecting frame 1, a light curtain module 2, and an optical detection module 3. Furthermore, the connecting frame 1 has a first end portion 101 and a second end portion 102 opposite the first end portion 101. The light curtain module 2 is disposed between the first end portion 101 and the second end portion 102 of the connecting frame 1. The light curtain module 2 includes a light emitter 20 electrically connected to the display D so as to project an invisible light curtain L1 parallel to the display surface D100. The optical detection module 3 is disposed on the second end portion 102 of the connecting frame 1. The optical detection module 3 includes a light detector 30, e.g. a CMOS sensor, electrically connected to the display D to retrieve information associated with a touch position where an object touches the invisible light curtain. More specifically, the optical sensor S includes a control module 4 electrically connected between the light detector 30 and the display D, in which the information retrieved by the optical detection module 3 is transmitted through the control module 4 to the display D.

More specifically, when an object, e.g. the finger of a user, touches the display D, the object blocks the light path of the invisible light curtain L1 such that the light detector 30 receives only light signals from the light curtain module 2 to the touch position. The light sensor S then determines the touch position by determining the position where the invisible light curtain L1 stops sending light signals to the light detector 30. Next, the control module 4 sends the information associated with the touch position to the display D for the display D to perform corresponding commands. In this way, the optical touch control system Z achieves touch control functionality of the display D.

In the present embodiment, the display D is a frameless display screen, and the first end portion 101 of the connecting frame 1 is disposed on the display D. Furthermore, in the present embodiment, the light emitter 20 is an invisible laser light emitter; however, the present disclosure is not limited thereto. In other embodiments, the light emitter 20 can be other types of invisible light emitter such as an infrared emitter.

According to the first embodiment of the present disclosure, the optical sensor S further includes a light emitting module 5 disposed on the second end portion 102 of the connecting frame 1. The light emitting module 5 includes at least one LED 50 electrically connected to the display D so as to project decoration light onto the display D. Specifically, as shown in FIG. 3, the LED 50 projects decoration light L2 onto the display D so as to improve the appearance of the display D and in the meanwhile make the existence of the connecting frame 1 less obvious so as to bring the optical touch control system Z into an appearance of wholeness. To be more specific, in the present embodiment, the display D and the LED 50 can light up alternately, that is to say, when the user does not want to use the display D, by a touch on the display D the display D will be turned off and the LED 50 will start projecting decoration light on the display D. The display D can once again be turned on by a touch thereon when the user wishes to use the display D, upon which the LED 50 is turned off. However, the present disclosure is not limited thereto. In other embodiments, the light emitting module 5 can have a plurality of LEDs 50, and the LED 50 can be used for lighting.

Moreover, the light curtain module 2, the optical detection module 3, and the light emitting module 5 are electrically connected to the display D via a conductive wire 10 embedded in the connecting frame 1 so that the light curtain module 2, the optical detection module 3, and the light emitting module 5 can share the electricity provided by the display D through the conductive wire 10. In this way, the light curtain module 2 being separately installed on the display D can be dispensed with, thus saving the manufacturing costs of the optical touch control system Z.

Accordingly, the control module 4 is electrically connected to the light curtain module 2, the optical detection module 3, and the light emitting module 5 at the same time and thus the light curtain module 2, the optical detection module 3, and the light emitting module 5 can share the control module 4 so that electricity provided by the display D can be transmitted through the control module 4 to the light curtain module 2, the optical detection module 3, and the light emitting module 5. By the solution in which the control module 4 is electrically connected between the light curtain module 2 and the display D and between the optical detection module 3 and the display D, the light sensor can detect the touch in synchronicity with the touch action.

The Second Embodiment

With reference to FIGS. 1 to 4, the display D of the optical touch control system Z of the present embodiment is a framed display screen, and the optical touch control system Z includes a light-transparent board B, in which the light-transparent board B is disposed between the display D and the invisible light curtain L1. The light curtain module 2 is disposed near the top of the light-transparent board B. The components of the optical touch control system Z of the present embodiment that have the same reference numbers as their counterpart components of the first embodiment will not be further described herein.

If the light curtain module 2 is directly disposed on the display D with a frame, a gap would exist between the invisible light curtain L1 and the display surface D100, which causes calculation errors when the light detector 30 determines the touch position. With the light-transparent board B being disposed on the display D, the distance between the position where the user blocks the light curtain and the position where the user actually touches the display D can be reduced, thus providing an accurate detection of the touch position.

The Third Embodiment

Referring to FIGS. 1 to 5, the optical touch control system Z includes a two way mirror M disposed between the display D and the invisible light curtain L1, and the light curtain module 2 is disposed near the top of the two way mirror M. The display D can be a framed or frameless display screen. In the present embodiment, the display D is a frameless display screen. The components of the optical touch control system Z of the present embodiment that have the same reference numbers as their counterpart components of the first embodiment will not be further described herein.

In the present embodiment, the two way mirror M serves as a mirror when the display D is not in use, and when the user activates the display D by touching the two way mirror M, the content shown by the display D can be seen through the two way mirror M. In addition, the content shown by the display D can be controlled by touching the two way mirror M.

In the present embodiment, the optical touch control system Z can be used in homes, restaurants, public places, etc. When the display D is not in use, the optical touch control system Z appears like a normal mirror, and when a user touches the two way mirror M, the display D is activated. Therefore, the optical touch control system Z provides users with dual functionality as a mirror and as a display.

It is worth noting that the optical touch control system Z can be equipped with an alcohol test device, e.g. a $CO_2$ detector. When a user with a high blood alcohol level approaches the two way mirror M of the optical touch control system Z, the optical touch control system Z provides warning text messages or alert sounds through the display D to remind the user of the excessive blood alcohol concentration. Furthermore, the display D can provide a game retesting the blood alcohol concentration of the user. However, the present disclosure is not limited thereto.

In summary, the present disclosure is advantageous in that, through the modularization of the light detection module and the light curtain module, which are combined together in the optical touch control system and the optical sensor thereof, the time gap between the detection of the touch position and the touch action can be reduced and the synchronicity therebetween can be enhanced. Furthermore, the modularization of the optical detection module and the light curtain module reduces the manufacturing costs and allows the relative position between the optical detection module and the light curtain module to be determined and calibrated during the manufacturing process, and thus spare the time needed for adjustment before and during use. In addition, the optical touch control system and the optical sensor thereof are advantageous for its easy installation due to the modularization.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An optical sensor applicable to a display having a display surface, the optical sensor comprising:
    a connecting frame having a first end portion and a second end portion disposed opposite the first end portion;
    a light curtain module disposed between the first end portion and the second end portion of the connecting frame, wherein the light curtain module includes a light emitter electrically connected to the display so as to generate an invisible light curtain parallel to the display surface; and
    an optical detection module disposed on the second end portion of the connecting frame, wherein the optical detection module includes a light detector electrically connected to the display so as to retrieve information associated with a touch location where an object touches the invisible light curtain;
    wherein a two way mirror disposed between the display and the invisible light curtain, and the light curtain module is disposed near the top of the two way mirror.

2. The optical sensor according to claim 1, wherein the first end portion of the connecting frame is disposed on the display, and the light emitter is an invisible laser light emitter.

3. The optical sensor according to claim 1, further comprising a light emitting module disposed on the second end portion of the connecting frame, wherein the light emitting module includes at least one LED electrically connected to the display so as to project decoration light onto the display.

4. The optical sensor according to claim 1, wherein the light curtain module and the light detection module are electrically connected to the display through a conductive wire embedded in the connecting frame.

5. An optical touch control system, comprising:
    a display having a display surface;
    an optical sensor including:
        a connecting frame having a first end portion and a second end portion disposed opposite the first end portion;
        a light curtain module disposed between the first end portion and the second end portion of the connecting frame, wherein the light curtain module includes a light emitter electrically connected to the display so as to generate an invisible light curtain parallel to the display surface; and
        an optical detection module disposed on the second end portion of the connecting frame, wherein the optical detection module includes a light detector electrically connected to the display so as to retrieve information associated with a touch location where an object touches the invisible light curtain; and
    a two way mirror disposed between the display and the invisible light curtain, wherein the light curtain module is disposed near the top of the two way mirror,
    wherein the optical sensor includes a control module electrically connected to the light detector and the display such that the information retrieved by the optical detection module can be transmitted through the control module to the display.

6. The optical touch control system according to claim 5, wherein the first end portion of the connecting frame is disposed on the display, and the light emitter is an invisible laser light emitter.

7. The optical touch control system according to claim 5, further comprising a light emitting module disposed on the second end portion of the connecting frame, wherein the light emitting module includes at least one LED electrically connected to the display so as to project decoration light onto the display.

8. The optical touch control system according to claim 7, wherein the control module is electrically connected to the light curtain module and the light emitting module, and wherein the light detector, the light curtain module and the light emitting module share the control module so that electricity provided by the display can be transmitted through the control module to the light curtain module, the light detection module and the light emitting module.

9. The optical sensor control system according to claim 5, wherein the light curtain module and the light detection module are electrically connected to the display through a conductive wire embedded in the connecting frame.

10. The optical touch control system according to claim 5, further comprising: a light-transparent board disposed between the display and the invisible light curtain, wherein the light curtain module disposed near the top of the light-transparent board.

* * * * *